United States Patent [19]

Rienass et al.

[11] 4,166,714

[45] Sep. 4, 1979

[54] ELECTROMAGNETIC PUMP

[75] Inventors: Rainer Rienass; Enno Buscher; Walter Jansing, all of Bergisch Gladbach, Fed. Rep. of Germany

[73] Assignee: Interatom, International Atomreaktorbau G.m.b.H., Bergisch Gladbach, Fed. Rep. of Germany

[21] Appl. No.: 826,632

[22] Filed: Aug. 22, 1977

[30] Foreign Application Priority Data

Aug. 20, 1976 [DE] Fed. Rep. of Germany ....... 2637473

[51] Int. Cl.² .............................................. H02N 4/20
[52] U.S. Cl. ............................................................ 417/50
[58] Field of Search ........................................... 417/50

[56] References Cited

U.S. PATENT DOCUMENTS

| 2,658,452 | 11/1953 | Donelian | 417/50 |
|---|---|---|---|
| 2,786,416 | 3/1957 | Fenemore | 417/50 |
| 2,808,002 | 10/1957 | Erwin | 417/50 |
| 3,196,795 | 7/1965 | Baker | 417/50 |
| 3,251,302 | 5/1966 | Baker | 417/50 |
| 3,885,890 | 5/1975 | Davidson | 417/50 |

FOREIGN PATENT DOCUMENTS

| 543214 | 2/1932 | Fed. Rep. of Germany | 417/50 |
|---|---|---|---|
| 1254914 | 1/1961 | France | 417/50 |
| 2293101 | 6/1976 | France | 417/50 |
| 173610 | 10/1965 | U.S.S.R. | 417/50 |

*Primary Examiner*—Carlton R. Croyle
*Assistant Examiner*—Edward Look
*Attorney, Agent, or Firm*—Herbert L. Lerner

[57] ABSTRACT

In an electromagnetic pump for electrically conductive liquid, two coaxial tubes radially spaced from one another and defining an annular channel therebetween traversible by the conductive liquid, and induction coils disposed within the inner coaxial tube.

2 Claims, 4 Drawing Figures

ELECTROMAGNETIC PUMP

The invention of the instant application relates to an electromagnetic pump for electrically conductive liquids having induction coils which are disposed at an annular or ring channel defined by two concentric or coaxial tubes and which is traversible by a flow in longitudinal direction. This pump is particularly well suited for hot liquid metals such as sodium, for example, in nuclear power plants, since it has no moving, wear- and trouble-prone parts.

In German Published Non-Prosecuted Application DT-OS 22 40 120, an electromagnetic pump is described which is formed primarily of two concentric or coaxial tubes, the outer tube of which is surrounded by induction coils and the inner tube of which is made of a ferritic material in order to aid the magnetic reflux or return flow.

The liquid metal flows in longitudinal direction between both concentric or coaxial tubes, is deflected 180° or reversed at the end thereof and then flows back through the inner tube in opposite direction. The induction coils disposed on the outside of the tubes are easy to cool and can be assembled or replaced without the need to open the pipelines conducting the liquid metal. A disadvantage of this construction is the considerable pressure loss in the necessarily sharp-edged or abrupt 180°-deflection or reversal. Especially in the case of high pump ratings or outputs, the low efficiency resulting from such a construction is of significance.

It is accordingly an object of the invention of the instant application to provide an electromagnetic pump for electrically conductive liquids wherein the output is increased not only by increasing the dimensions of the pump but also by improving the efficiency thereof. In this connection, the induction coils should be, on the one hand, relatively easy to cool and, on the other hand, replaceable without having to open the lines containing the liquid metal.

With the foregoing and other objects in view, there is provided, in accordance with the invention, in an electromagnetic pump for electrically conductive liquid, two coaxial tubes radially spaced from one another and defining an annular channel therebetween traversible by the conductive liquid, and induction coils disposed within the inner coaxial tube. In this construction, the induction coils can be replaced and cooled with little effort and nevertheless, the 180°-deflection of the liquid metal which, of course, is accomplished by a considerable pressure loss, can be dispensed with. It is important in this regard that the inner tube be made of a nonmagnetic material with an electric conductivity that is as low as possible. For circulating liquid metal at high temperature, only a tube formed of metal can, in general, be considered for reasons of strength but, if suitable alloys are used (e.g., a nicke-chromium-iron alloy), the proportion of the tube wall to the total cross section of electric conduction, especially for large tube diameters, can be reduced to a very small magnitude, in view of the relatively high conductivity of the liquid metals.

In accordance with another feature of the invention, induction coils are also disposed outside the outer coaxial tube or, in other words, radially outwardly of the annular channel in addition to the induction coils within the inner coaxial tube or radially inward of the annular channel. The electromagnetic force acting on a given length of the annular or ring gap between the inner and the outer tubes can thereby be increased considerably, and an output gain of up to 80% can be achieved with the same overall structural length.

The proposed direction of induction coils radially inwardly and radially outwardly of the annular channel, according to the invention, has the additional advantage that the pump can continue to be operated if one of the two coils fails, although with reduced output. If the outer coils are to be replaced without requiring opening of the lines containing the liquid metal, it is advisable to unwind these coils at the installation site and to rewind the new coils on the outer tube likewise in situ.

In accordance with a further feature of the invention, the inner coaxial tube is open at one end and closed at the other end thereof. With this construction, the inner and the outer tubes are connected only at the open end of the inner tube, so that the inner tube can freely expand in the case of temperature changes and, therefore, no axial compensator exposed to the hot liquid metal is required. The inflow and outflow for the liquid metal is realizable in a conventional manner by stubs or connecting pipes connected perpendicularly to the longitudinal axis of the outer tube.

In accordance with an added feature of the invention, a connecting pipe or union is included, connected to and disposed in axial direction of the outer coaxial tube for supplying the conductive liquid thereto. If the inner tube, which is closed at this end, is provided with a rounded or stream-lined shape which is highly desirable in flow technology, the pressure loss at the inlet becomes considerably smaller than with the stub or union connected at right angles. The inlet pressure of the pump can be lower and the temperature higher without any possibility of the occurrence of cavitation.

In accordance with an additional feature of the invention, the inner coaxial tube wherein the induction coils are disposed is open at both ends thereof. With this construction the inner induction coils can be cooled considerably better than possible with the heretofore known constructions since the coolant can be fed in at one end of the tube and discharged at the other end. In the hereinaforementioned construction wherein the inner tube is closed at one end thereof, the coolant must be conducted both forward and back.

In accordance with yet another feature of the invention, a support tube is disposed within and coaxially to the inner coaxial tube, the induction coils being releasably fastened to the support tube. The inner induction coils are to be mounted or assembled and fixed in the inner tube by this support tube. Since the inner tube, for reasons of improved efficiency of the pump, should be as thin-walled as possible and also should be formed with a slight clearance from the induction coils, it is advantageous to relieve this inner tube, as much as possible, of support functions.

In accordance with yet a further feature of the invention, the support tube is hollow and is formed with means for supplying and discharging coolant for the induction coils. This construction is especially practical and advantageous if the inner tube is closed at one end. Then, the coolant can be fed in, for example, through the support tube at one end thereof, then deflected or reversed at the other end thereof and returned through the induction coils (or vice versa).

In accordance with a concomitant feature of the invention, the inner and the outer coaxial tubes are mutually connected at one end thereof by a compensator for high and varying temperatures. If the different expansions possible between the outer and the inner tube can be equalized by a compensator, the outer and inner tube, respectively, are stressed less and can therefore be made thinner. Since the wall thickness of the outer and inner tubes represents a considerable resistance for the electromagnetic force of the pump, it is especially important that this wall be limited to the least permissible thickness.

Other features which are considered as characteristics for the invention are set forth in the appended claims.

Although the invention is illustrated and described herein as embodied in an electromagnetic pump, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 3:
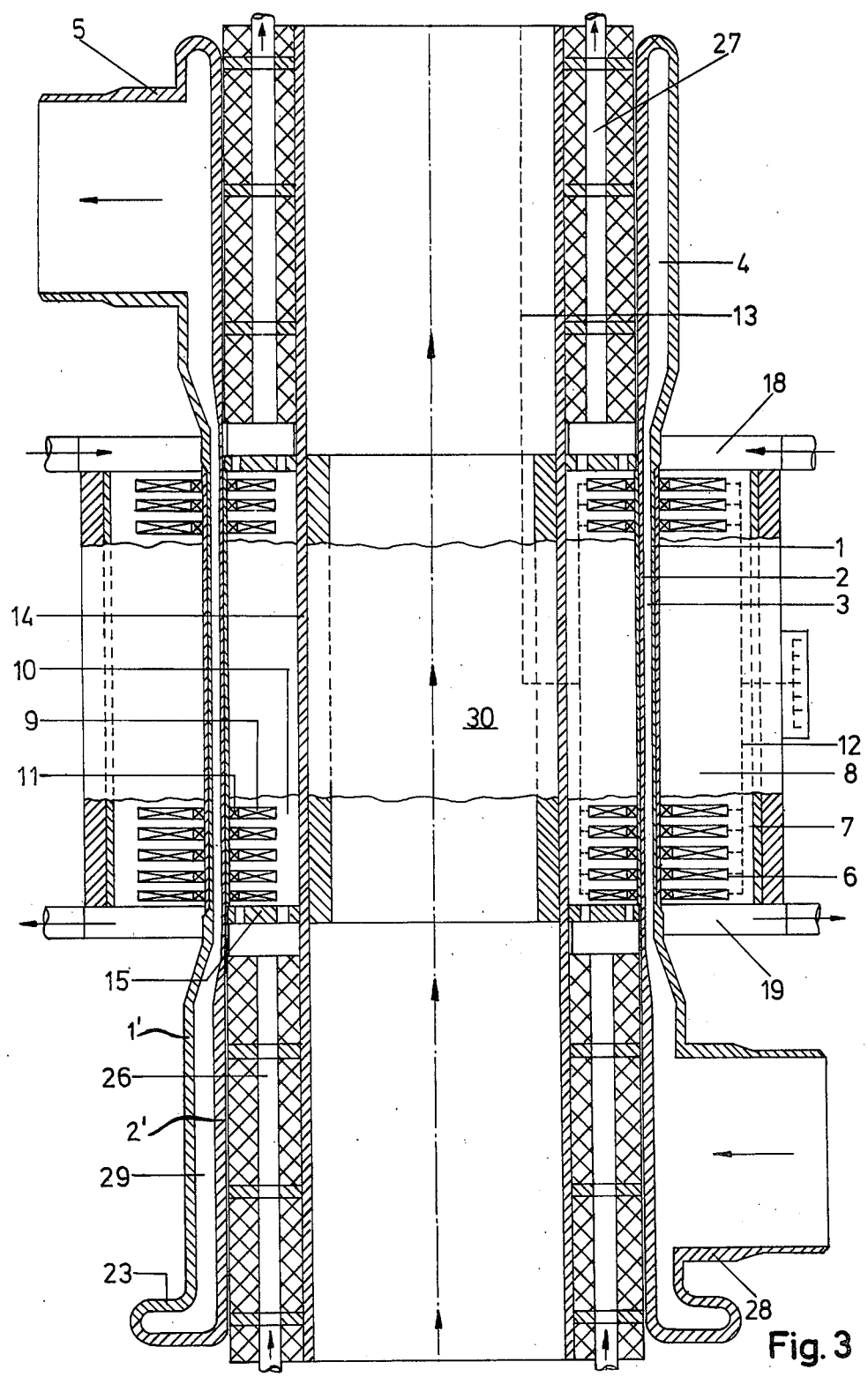
Figure 4:
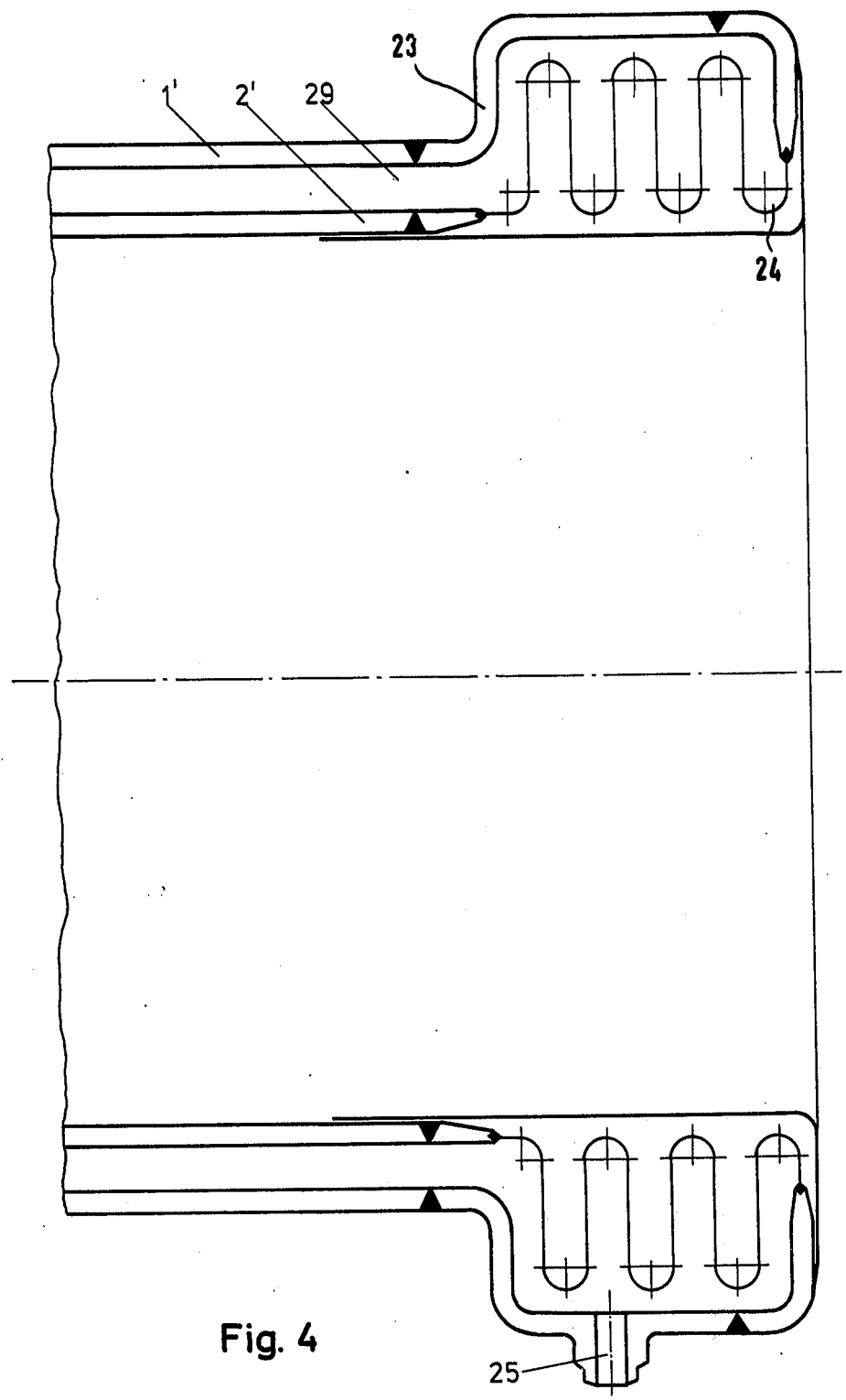

FIG. 3 is a vertically disposed longitudinal sectional view of a double-acting electromagnetic pump having an inner tube accessible at both ends of the pump and a respective connecting piece or union disposed perpendicularly thereto, for the inflow and outflow, respectively, of the liquid metal; and FIG. 4 is a fragmentary enlarged diagrammatic view of FIG. 3 showing the compensator disposed between the inner and the outer tubes of the pump.

Figure 1:
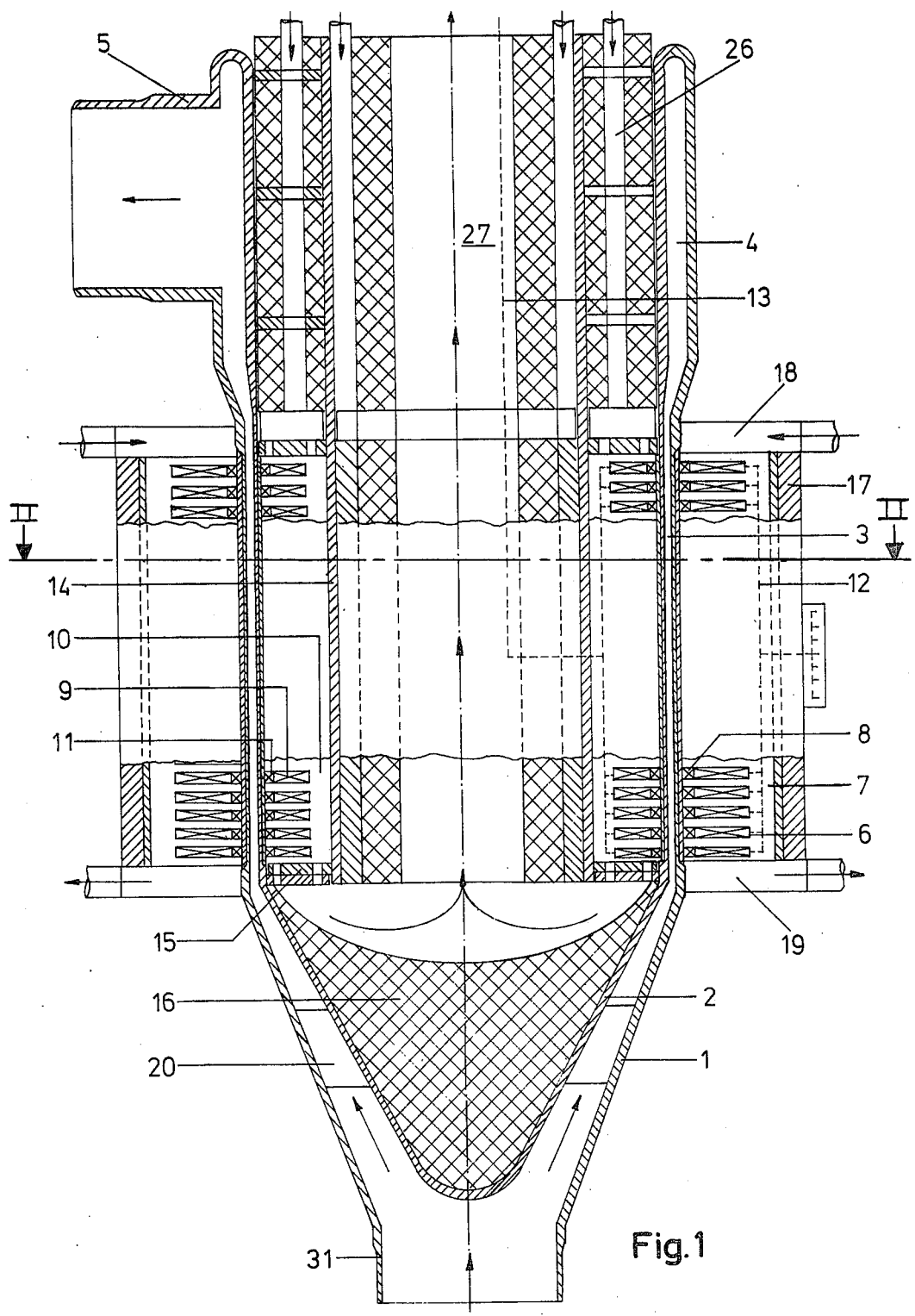
FIG. 1 is a vertically disposed longitudinal sectional view of a double-acting electromagnetic pump having an inlet for liquid metal disposed in axial direction and an outlet for the liquid metal disposed perpendicularly thereto.

Referring now to the drawing and first, particularly, to FIG. 1 thereof, there is shown in a longitudinal or axial sectional view, a pipe line which carries liquid metal and ends in a union 31. An outer tube 1 is connected to the union 31. An inner tube 2 is coaxially disposed within the outer tube 1 and, due to the illustrated shape thereof, ensures an inflow, as undisturbed as possible, of the liquid flow represented by the upwardly inclined arrows at the bottom of FIG. 1, into a pump channel 3 proper which is located between the inner and the outer tubes 2 and 1, respectively. Both the inner and outer tubes 2 and 1 are formed of nonmagnetic metal of relatively poor electrical conductance. Beyond the pump channel 3, the inner and the outer tubes 1 and 3, respectively, form an annular plenum 4, from which a continuing pipeline 5 branches off at right angles. Onto the outer tube 1, there is slid a first set of coils 6 which are wound, for example, of electrically oxidized aluminum tape and are disposed in suitable slots formed in a stack of transformer laminations which are stacked on top of an insulated from one another. The coils 6 are protected against the effects of heat from the pipeline 5 by a thermal insulation 8. Analogous thereto is the construction of a second coil set which is slipped into the inner tube 2 from the free end thereof and is formed of coils 9 in a stack of laminations 10 and with insulation 11. The two sets of coils 6 and 9 are advantageously disposed in the same region of the pump channel 3 i.e. opposite one another. In this manner, a most desirable development or formation of the electromagnetic field acting on the material to be transported is attained. The coils 6 and 9 are supplied with electric current through lines 12 and 13 (indicated only diagrammatically by broken lines). The second set of coils 9 is disposed on a support tube 14, which is guided on the inside of the inner tube 2 by legs 15 and is releasably fastened in a suitable manner, for example, by a non-illustrated threaded or screw connection. The support tube 14 is hollow and serves simultaneously as a discharge 27 of a cooling fluid e.g. nitrogen, which can be delivered to the coils 9 through lines 26. The cooling effect is aided by disposing thermal insulation 16 in the tip of the inner tube 2. In a similar manner, the first set of coils 6, which is surrounded by a jacket 17, is also cooled, the coolant flowing through a feed line 18 and a discharge line 19. The stack of laminations 7 as well as the stack of laminations 10 have a star-shaped cross section (note FIG. 2), so that adequate intermediate spaces 21 and 22 are located between the individual legs of the lamination stack 7. Uniform spacing between the outer tube 1 and the inner tube 2 is ensured by several leg or bridgelike spacers 20 which are distributed over the periphery thereof. For repair and maintenance purposes or if the pump is to be equipped with another set of coils to vary the characteristic thereof, the coils 6 of the first set can be unwound. The coils 9 of the second set are readily replaceable after the fastening of the support tube 14 has been loosened and the latter has been withdrawn from the inner tube 2. The pump channel 3 is accessible for inservice tests due to this form or construction without requiring opening of the lines carrying liquid metal, thereby saving great manufacturing and testing expenses for welded seams which might have to be produced anew after a repair.

Figure 2:
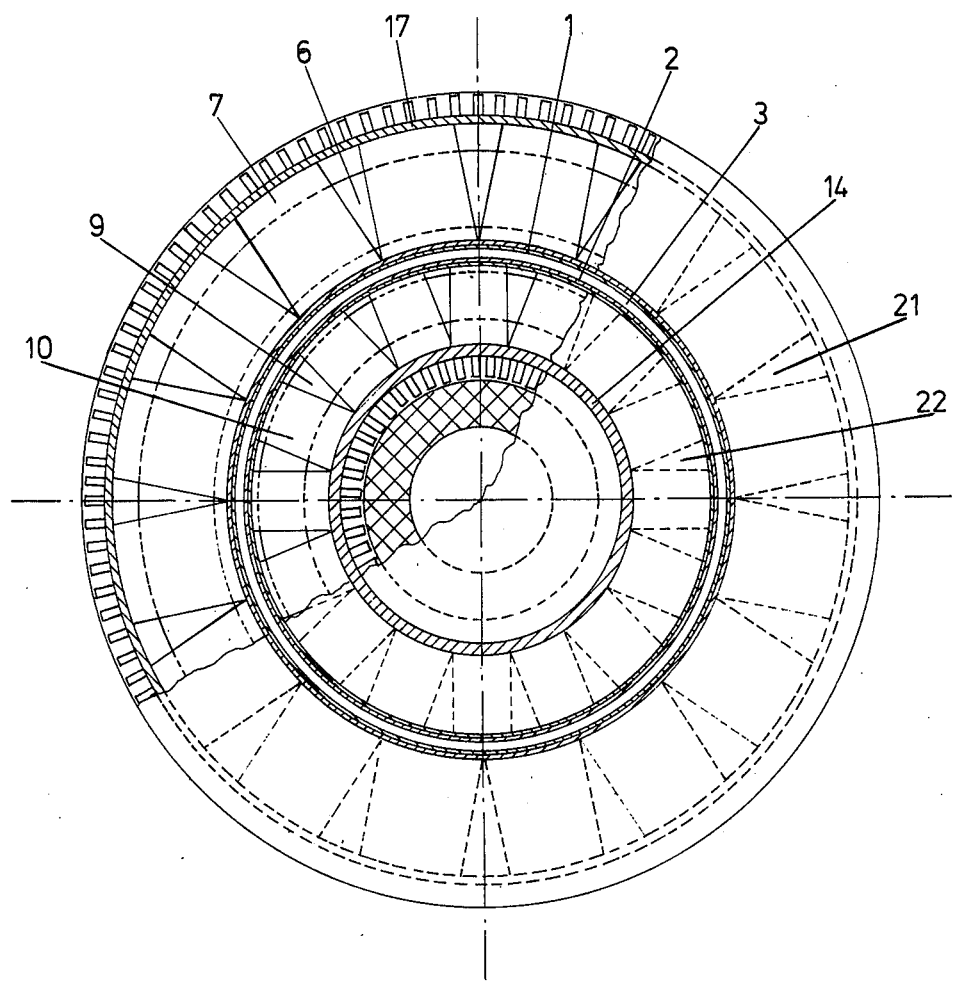
FIG. 2 is a cross-sectional view of FIG. 1 taken along the line II—II.

The cross-sectional view of FIG. 2 shows on the same scale as that of FIG. 1 and with the reference already used in FIG. 1 for like features, how the cooling channels and the induction coils are radially disposed.

FIG. 3 also shows, on the same scale as those of FIGS. 1 and 2, with the same reference numerals for like parts, another embodiment of the pump according to the invention with an improved cooling system for the inner induction coil 9. The outer tube 1' has also on the inlet end thereof, located at the bottom of FIG. 3, an annular space 29 acting as a manifold or distributor of the liquid metal which is supplied through the line 28, and the outer tube 1' is connected to the inner tube 2' through a compensator 23. The support tube 14 is slid into this inner tube 2' and serves simultaneously as a channel 30 for an additional flow of cooling fluid.

FIG. 4 diagrammatically shows various details of the compensator 23. Equalization of the different expansion of the outer tube 1' and the inner tube 2' due, for example, to thermal effects, is effected through a corrugated tube 24, which can be inspected and tested. A closable opening 25 is provided in the outer tube wall 1' for draining the liquid metal.

There are claimed:

1. In an electromagnetic pump for electrically conductive liquid, two coaxial tubes radially spaced from and stationary with respect to one another and defining an annular channel therebetween traversible by the conductive liquid, a first set of induction coils disposed outside said outer coaxial tube and a second set of induction coils disposed within said inner coaxial tube, and a support tube disposed within and coaxially to said inner coaxial tube, said second set of induction coils being releasably fastened to said support tube.

2. Electromagnetic pump according to claim 1, wherein said support tube is hollow and is formed with means for supplying and discharging coolant for said second set of induction coils.

* * * * *